(12) United States Patent
Wengerd et al.

(10) Patent No.: US 11,291,314 B2
(45) Date of Patent: Apr. 5, 2022

(54) DISPLAY SYSTEM HAVING A CONNECTOR FOR SELECTIVE ATTACHMENT WITH A SUPPORT SURFACE

(71) Applicant: Pioneer Farm Eqpt. Mfg., Inc., Dalton, OH (US)

(72) Inventors: John W. Wengerd, Dalton, OH (US); Leon W. Wengerd, Dalton, OH (US)

(73) Assignee: Pioneer Farm Eqpt. Mfg., Inc., Dalton, OH (US)

( * ) Notice: Subject to any disclaimer, the term of this patent is extended or adjusted under 35 U.S.C. 154(b) by 0 days.

(21) Appl. No.: 16/709,189

(22) Filed: Dec. 10, 2019

(65) Prior Publication Data

US 2020/0187676 A1  Jun. 18, 2020

Related U.S. Application Data

(60) Provisional application No. 62/779,101, filed on Dec. 13, 2018.

(51) Int. Cl.
| | | |
|---|---|---|
| *A47F 5/08* | (2006.01) | |
| *F16M 13/02* | (2006.01) | |
| *A47F 5/00* | (2006.01) | |

(52) U.S. Cl.
CPC .......... *A47F 5/0823* (2013.01); *A47F 5/0006* (2013.01); *F16M 13/022* (2013.01)

(58) Field of Classification Search
CPC .... A47F 5/0823; A47F 5/0006; F16M 13/022
USPC ............ 248/220.21, 220.31, 220.41, 220.43, 248/222.51
See application file for complete search history.

(56) References Cited

U.S. PATENT DOCUMENTS

| | | | | | |
|---|---|---|---|---|---|
| 857,543 | A | * | 6/1907 | Thomas | A47B 57/42 |
| | | | | | 248/243 |
| 2,691,502 | A | * | 10/1954 | Jones | A47B 96/1416 |
| | | | | | 248/243 |
| 2,927,956 | A | * | 3/1960 | Reisch | H05B 3/16 |
| | | | | | 174/138 J |
| 3,252,678 | A | * | 5/1966 | Lasch | A47F 5/06 |
| | | | | | 248/220.31 |
| 3,401,909 | A | * | 9/1968 | Kalahar | A47F 5/0823 |
| | | | | | 248/220.43 |
| 3,672,621 | A | * | 6/1972 | Bambenek | A47G 25/0678 |
| | | | | | 248/220.41 |
| 5,221,067 | A | * | 6/1993 | Burchell | E04B 2/74 |
| | | | | | 248/222.51 |

(Continued)

*Primary Examiner* — Kimberly T Wood
(74) *Attorney, Agent, or Firm* — Sand, Sebolt & Wernow Co., LPA

(57) ABSTRACT

A hook and associated support structure can collectively define a retail display system. The hook may include a first bar and a second bar that are connected together via a connecting bar. The first bar and the second bar define a slot that receives an edge of an aperture or slot in the support structure therein to selective attached the hook to the support structure. The orientation of the connecting portions of the hook preclude or reduce the likelihood of disconnection of the hook relative to the support structure when objects are attached to or removed from the hook. In one example, the selective disconnection of the hook from the support structure is only accomplished through a vertical or nearly vertical vector force.

2 Claims, 7 Drawing Sheets

(56) References Cited

U.S. PATENT DOCUMENTS

| | | | | |
|---|---|---|---|---|
| 5,595,309 A * | 1/1997 | Bauer | ............... | A47F 5/0815 |
| | | | | 211/59.1 |
| 5,647,566 A * | 7/1997 | Kump | ............... | A47F 5/0823 |
| | | | | 248/220.21 |
| 6,487,978 B1 * | 12/2002 | Hamberg | ............... | A47B 57/42 |
| | | | | 108/106 |
| 2003/0197102 A1 * | 10/2003 | Lin | ............... | A47B 57/42 |
| | | | | 248/220.43 |
| 2004/0227041 A1 * | 11/2004 | Lewis | ............... | A47B 57/425 |
| | | | | 248/220.41 |

* cited by examiner

DISPLAY SYSTEM HAVING A CONNECTOR FOR SELECTIVE ATTACHMENT WITH A SUPPORT SURFACE

CROSS REFERENCE TO RELATED APPLICATION

This application claims priority from U.S. Provisional Application Ser. No. 62/779,101, filed Dec. 13, 2018; the disclosure of which is incorporated herein by reference. The present disclosure relates generally to a display system.

TECHNICAL FIELD

The present disclosure relates generally to a display system. More particularly, the present disclosure relates to an improved pegboard display system. Specifically, the present disclosure relates to a retail display system that is structured to maintain a connection of a hook to a pegboard even when the hook is subjected to a rotation force from a customer trying to remove an object from the hook.

BACKGROUND

Background Information

Pegboards (i.e., perforated hardboard) are typically fabricated from an inexpensive wood, such as pine, and it may be chemically treated for strength and fire retardant characteristics or turned into plywood first. Perforated wood may be mounted as a thin strip instead of the more square shape of perforated hardboard. Metal pegboards are usually made out of steel.

The pegboards usually include a plurality of circular apertures defining rows and columns. The circular apertures are sized to receive a bent wire (also having a circular cross section) that is formed with a curve so as to position a portion of the wire behind the pegboard to selectively connect the wire to the pegboard. The forward end of the bent wire is usually formed with an arm, which may be straight or curved, that is configured to hold or hang objects thereon/therefrom. Collectively, the curved wire(s) connected to the pegboard defines a pegboard display systems.

One exemplary problem that often arises with pegboard display systems is that when a user tries to retrieve an object hanging or supported by the bent wire, the wire has a tendency to dislodge or disconnect from the pegboard. This is usually a result of the user lifting the object simultaneously upwardly and outwardly. The upwardly and outwardly lifting creates a rotational force at the connection point of the bent wire to the pegboard. The configuration of the bent wire, when subjected the rotational force, causes the wire to dislodge and to fall to the ground after the object is removed. It is a burden on the operator to pick up and re-install the bent wire each time they remove an object and the wire falls to the ground.

SUMMARY

Issues continue to exist with conventional pegboard display systems inasmuch as the conventional bent wires have a tendency to dislodge or disconnect from the pegboard when a user imparts, even accidentally, a rotational force to the bent wire (i.e., a hook) when removing an object therefrom. Thus, a need continues to exist for a display system that does not require a user to change its removal techniques, but rather accounts for a typically removal movement that imparts rotation forces and counteracts the same through its structural configuration such that the hook remains attached to the pegboard when subjected to a rotational force during object removal. The present disclosure address these and other issues.

In one aspect, an exemplary embodiment of the present disclosure may provide a hook for selectively connecting with a support structure defining a plurality of apertures, wherein the hook is repeatably connected to one aperture in the support structure, the hook comprising: a first end opposite a second end defining a longitudinal direction therebetween; a first side opposite a second side defining a transverse direction therebetween that is orthogonal to the longitudinal direction; a top opposite a bottom defining a vertical direction therebetween that is orthogonal to the longitudinal direction and the transverse direction; a first bar having a length oriented in the vertical direction, and the first bar including an upper wall offset parallel to a lower wall, and a front wall extending vertically downward from a forward end of the upper wall, and a convexly curved wall connected to a lower end of the front wall curving approximately ninety degrees from the lower end of the front wall to the lower wall, and the first bar including a rear wall, and wherein the first bar is rectangular or square in cross section; a connecting bar rigidly connected to the rear wall of the first bar and extending outwardly therefrom in the longitudinal direction towards the second end and offset closer to the upper wall on the first bar than the lower wall of the first bar, and the connecting bar including a convexly curved upper wall curving approximately ninety degrees from the rear wall first bar, wherein the connection of the connecting bar to the rear wall of the first bar divides the rear wall of the first bar into an upper portion and a lower portion, and the connecting bar includes a lower wall extend orthogonal outward towards the second end from the rear wall of the first bar; a second bar having a length oriented in the vertical direction, and the second bar including a front wall spaced apart and offset parallel to the rear wall of the first bar, and the second bar including a rear wall extending vertically downward from the convexly curved upper wall on the connecting bar; and a slot defined between the lower portion of the rear wall on the first bar, the lower wall on the connecting bar, and the forward wall on the second bar, wherein the slot is adapted to connect with a lower edge defining a portion of the one aperture in the support structure, wherein the shape of the slot precludes detachment or disconnection of the hook from the support structure when the hook is subjected to rotational forces when attaching and removing objects from the hook. This exemplary embodiment or another exemplary embodiment may further include an arm extending outwardly in a cantilevered manner from the second bar towards a free terminal end, wherein the arm is angled relative to the second bar at an angle less than ninety degrees operative to gravitationally bias object or products support by the arms towards the support structure.

In another aspect, an exemplary embodiment of the present disclosure may provide a hook and associated support structure that collectively define a retail display system. The hook may include a first bar and a second bar that are connected together via a connecting bar. The first bar and the second bar define a slot that receives an edge of an aperture or slot in the support structure therein to selectively attached the hook to the support structure. The orientation of the connecting portions of the hook preclude or reduce the likelihood of disconnection of the hook relative to the support structure when objects are attached to or removed from the hook. In one example, the selective disconnection of the hook from the support structure is only accomplished through a vertical or nearly vertical vector force.

In yet another aspect, an exemplary embodiment of the present disclosure may provide a hook for selectively connecting with a support structure defining a plurality of apertures, wherein the hook is repeatably and releasbly connected to one aperture in the support structure, the hook comprising: a first bar having flat first and second sides and length that positions a portion of the first bar rearward and below the one aperture in the support structure when the hook is releasably connected to the support structure; and a second bar having a length that positions a portion of the second bar forward and below the one aperture when the hook is releasably connect to the support structure. This exemplary embodiment or another exemplary embodiment may further include a connecting bar extending between the first bar and the second bar, and the connecting bar having flat first and second sides that extend through the one aperture when the hook is releasably connected to the support structure. This exemplary embodiment or another exemplary embodiment may further include a rear wall on the first bar, wherein the connective bar is rigidly connected to the first bar to define the rear wall into a lower portion and an upper portion, wherein the lower portion is the portion of the first bar that is rearward and below the one aperture in the support structure when the hook is releasably connect to the support structure. This exemplary embodiment or another exemplary embodiment may further include upper and lower ends of the rear wall, wherein the connecting bar is rigidly connected closer to the upper end of the rear wall such that the lower portion of the rear wall is longer than the upper portion of the rear wall. This exemplary embodiment or another exemplary embodiment may further include a lower wall on the connecting bar that is positioned parallel to a longitudinal direction of the hook and perpendicular to a rear wall on the first bar and a forward wall on the second bar. This exemplary embodiment or another exemplary embodiment may further include a slot defined and bound by a lower portion of the rear wall on the first bar and the lower wall on the connecting bar and the forward wall on the second bar; wherein a thickness dimension of the slot is in a range from about $5/64$ inch to about $1/4$ inch. This exemplary embodiment or another exemplary embodiment may further include a convexly curved wall on the connecting bar that extends in a curved manner between a corner at the first bar and a transition point that is offset approximately 90° from the corner; wherein a radius of curvature of the convexly curved wall on the connecting bar is in a range from about $3/16$ inch to about $7/16$ inch. This exemplary embodiment or another exemplary embodiment may further include a convexly curved wall on the first bar that extends downwardly and convexly curves from a lower end of a forward wall between the first and second sides on the first bar. This exemplary embodiment or another exemplary embodiment may further include a radius of curvature of the convexly curved wall that extends between the lower end of the forward wall to a transition point that is in a range from about $3/16$ inch to about $7/16$ inch. This exemplary embodiment or another exemplary embodiment may further include an upper wall on the first bar that is positioned between the first and second sides; a lower wall on the first bar that is positioned between the first and second sides; wherein the convexly curved wall terminates the transition point that adjoins the lower wall, wherein the lower wall is offset and substantially parallel to upper wall and the lower wall is dimensionally shorter than the upper wall due to the convexly curved wall. This exemplary embodiment or another exemplary embodiment may further include an upper wall on the first bar that is positioned between the first and second sides; a lower wall on the first bar that is positioned between the first and second sides; a vertical length of the first bar measured from the upper wall to the lower wall, wherein the vertical length is in a range from about $7/32$ inch to about $13/32$ inch. This exemplary embodiment or another exemplary embodiment may further include wherein a vertical length of one aperture in the support structure is greater than the vertical length of the first bar measured from the upper wall to the lower wall.

In yet another aspect, another exemplary embodiment of the present disclosure may provide a method comprising: aligning a hook offset from a support structure defining a plurality of oblong apertures, wherein a first end of the hook is oriented closer to the support structure than a second end of the hook; moving the first end of the hook towards one oblong aperture in the plurality of oblong apertures; rotating the hook in a first direction about a transverse axis of the hook to angle a forward wall on a first bar on the hook slightly downward and a rear wall on the first bar slightly upward; passing a portion the first bar through one of the oblong apertures; lifting the hook vertically with the portion of the first bar rearward of the support structure; rotating the hook in an opposite second direction about the transverse axis; lowering the hook vertically to receive the support structure in a slot defined between the first bar and a second bar on the hook to slidably connect the hook to the support structure. This exemplary embodiment or another exemplary embodiment may further include wherein rotating the hook in the opposite second direction further comprises: passing a convexly curved surface on the first bar above an upwardly facing lower edge of the oblong aperture to dispose the first bar rearward from a rear surface of the support structure. This exemplary embodiment or another exemplary embodiment may further include contacting a lower wall of a connecting bar extending between the first and second bars on the hook with the upwardly facing lower edge of the oblong aperture. This exemplary embodiment or another exemplary embodiment may further include straddling the support structure through the oblong aperture with the first bar and the second bar on the hook such that the first and second bars extend downwardly from upwardly facing lower edge of the oblong aperture. This exemplary embodiment or another exemplary embodiment may further include disposing an upper wall on the first bar rearward and at a lower vertical height than a downwardly facing upper edge of the oblong aperture in the support structure. This exemplary embodiment or another exemplary embodiment may further include wherein passing the portion the first bar through one of the oblong apertures comprises: moving planar sidewalls on the first bar through linear vertically aligned first and second edges defining one oblong aperture in the plurality of oblong apertures.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
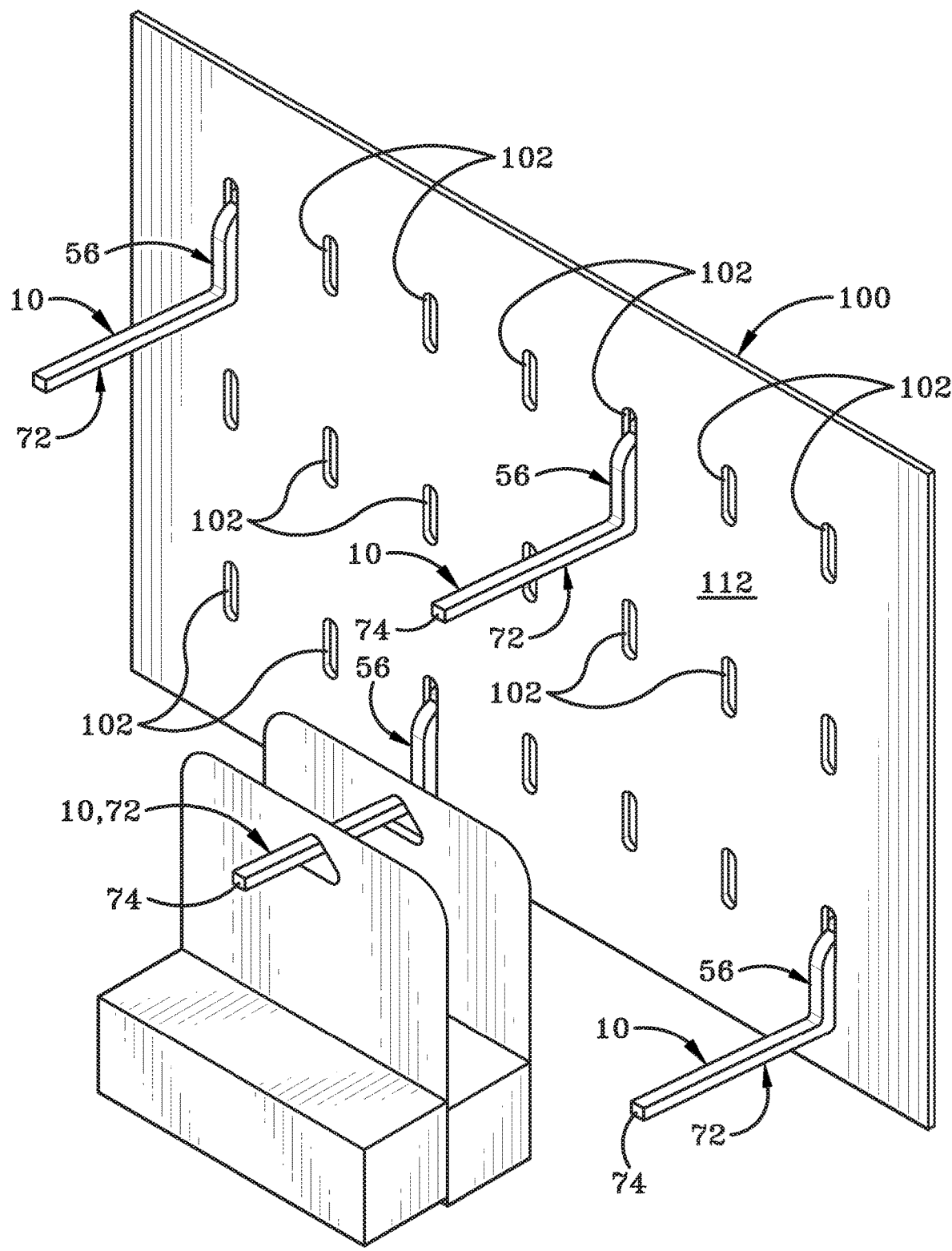
FIG. 1 (FIG. 1) is a perspective view of the a retail display system in accordance with one aspect of the present disclosure having a hook connected to a support structure.

FIG. 1 depicts a hook in accordance with one aspect of the present disclosure generally at 10. Hook 10 connects with a support structure 100 including a plurality of slots or apertures 102 defined therein. In one embodiment, slots or apertures 102 are elongated so as to define an oblong shape or oblong configuration in at least one aperture 102 in the support structure 100. Hook 10 is configured to support a product thereon to be displayed in a retail environment.

Figure 2:
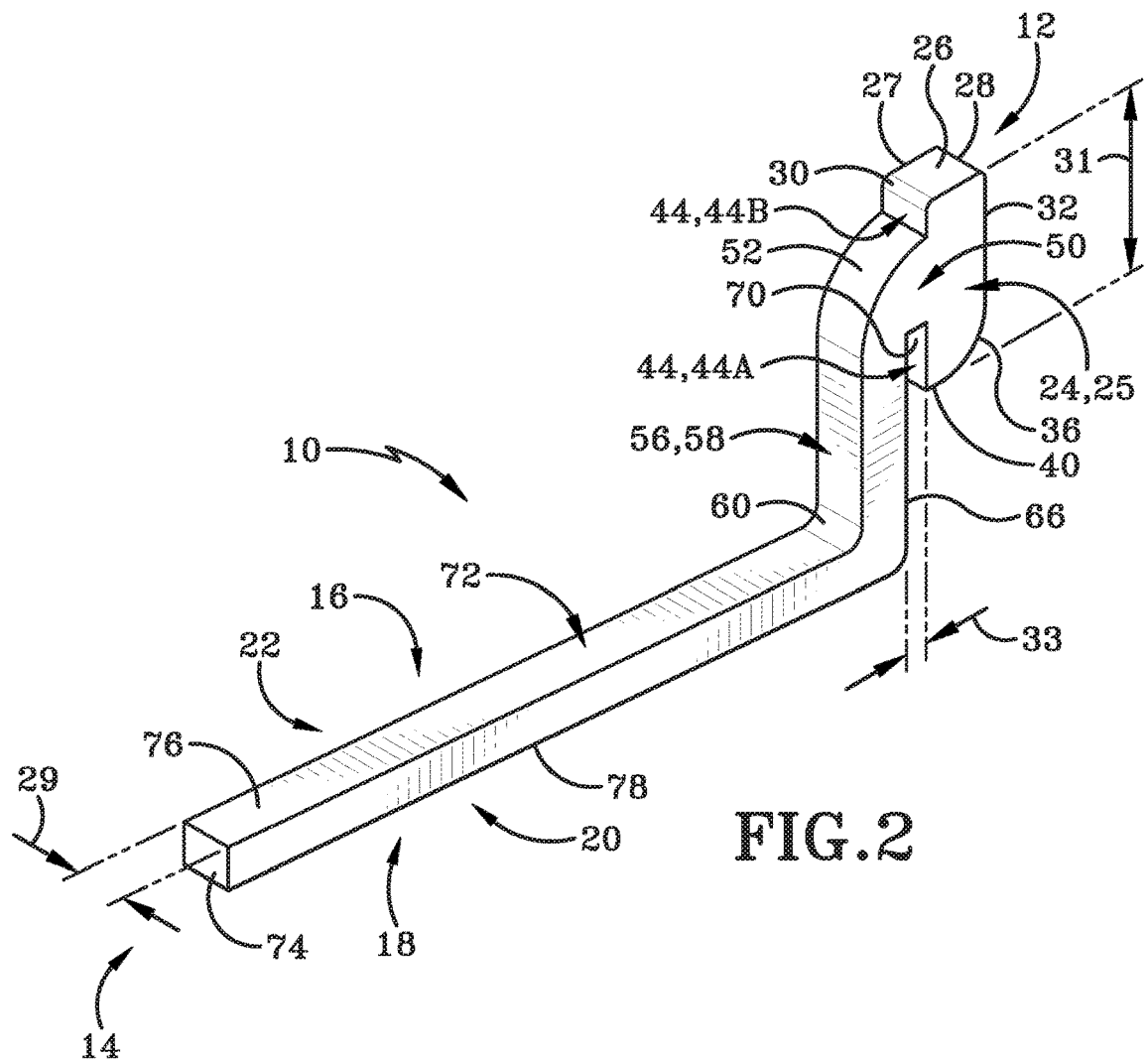
FIG. 2 (FIG. 2) is a perspective view of the hook.
Figure 3:
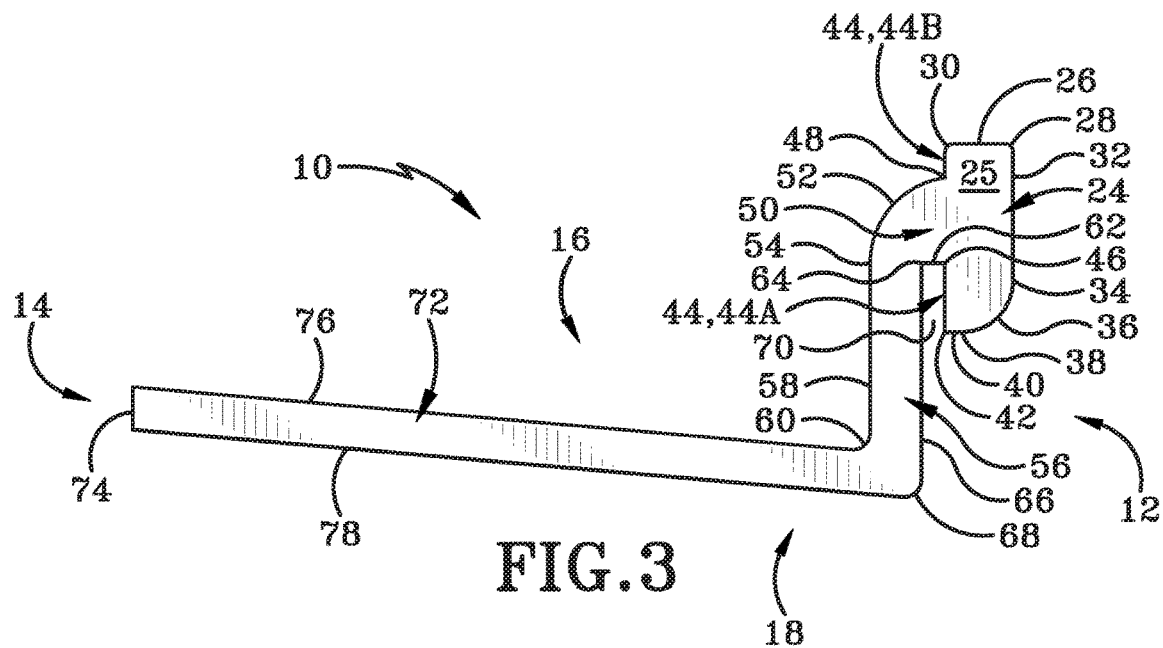
FIG. 3 (FIG. 3) is a first side elevation view of the hook.

FIG. 2 and FIG. 3 depict the hook 10 including a first end 12 that is configured to connect with a slotted opening in the support structure 100 that is positioned opposite a distal and free terminal second end 14. A longitudinal direction of the hook 10 is defined between the first end 12 and the second end 14. The hook 10 further includes a top 16 opposite a bottom 18 defining a vertical direction therebetween. The hook 10 additionally includes a first side 20 opposite a second side 22 defining a transverse direction therebetween.

In accordance with one aspect of the present disclosure, the hook 10 is configured to improve upon previous pegboard style hooks that were circular in cross-section and were easily and inadvertently removed or disconnected from the pegboard in response to removing an item or object from the second end of the hook. Accordingly, the first end 12 of the hook 10 has structural features that are configured to reduce the likelihood that the hook 10 separates from the slotted support structure 100 (i.e., generally a slotted pegboard) when an item is removed from the second end 14 of the hook 10. Further, while the hook 10 is configured to be constructed as a unibody, monolithic, single member formed from a unitary material, portions of the hook 10 will be described with references to other portions thereof and may be described with different references, but physically constructed from the same material. For example, the hook 10 may be fabricated by laser cutting the hook 10 from a single sheet of metal material so as to define the structural relationships described herein.

With continued reference to FIG. 2 and FIG. 3, a first bar 24 defines the first end 12 and the top 16. First bar 24 includes an upper wall 26 that is substantially flat and aligned in a longitudinal direction having a length of about 0.25 inches. Upper wall 26 extends between a first rounded corner 28 and a second rounded corner 30. Upper wall 26 is substantially parallel to the longitudinal axis between the rounded corner 28 and the rounded corner 30. The first bar 24 further includes a forward wall 32 that extends vertically downward from the first rounded corner 28 to a lower end 34 of the forward wall 32. Forward wall 32 is substantially and vertically planar between the rounded corner 28 and its lower end 34. A convexly curved wall 36 extends downwardly and convexly curves towards the second end 14 from the lower end 34 of the forward wall 32. The convexly curved wall 36 may have a radius of curvature extending between lower end 34 of forward wall 32 to the transition point 38 that is in a range from about 3/16 inch to about 7/16 inch. In one particular embodiment, the radius of curvature of the curved wall 36 between the lower end 34 and the transition point 38 is about 5/16 inch (0.313 inch). The convexly curved wall 36 terminates a flat horizontal point 38 that adjoins a lower wall 40. Lower wall 40 is offset and substantially parallel to upper wall 26. However, the flat portion of the lower wall 40 is shorter or dimensionally less than that of the upper wall 26 based on the configuration of the curved wall 36. The lower wall 40 is substantially flat between the transition point 38 and a corner 42. A rear wall 44 extends between the lower corner 42 and the upper second rounded corner 30. However, the rear wall 44 is divided into a lower portion 44A and an upper portion 44B. The lower portion 44A of the rear wall 44 extends between the corner 42 and a corner 46. The upper portion 44B of the rear wall 44 extends between the rounded corner 30 and a corner 48. The corners 46, 48 are defined by a connecting bar 50 that is attached to the rear wall 44. In one particular embodiment, the connecting bar 50 is disposed more towards the top 16 of the hook 10 so as to be positioned closer to the upper wall 26 than the lower wall 40.

The bar 24 includes a first side surface 25 and an opposing second side surface 27. The first side surface 25 and the second side surface 27 are bound by the upper wall 26, the forward wall 32, the curved wall 36, the lower wall 40, and the lower portion 44A and the upper portion 44B of the rear wall 44. A transversely aligned thickness (i.e., dimension 29) of the hook 10 is defined between the first side surface 25 and the second side surface 27 of the first bar 24. Accordingly, the upper wall 26, the forward wall 32, the lower wall 40, and the rear wall 44 may be associated and each has a thickness defined by the transverse distance between the first side surface 25 and the second side surface 27 of the first bar 24. In one particular embodiment, the transverse thickness (i.e., dimension 29) of the first bar 24 measured between the first side surface 25 and the second side surface 27 is about 3/16 inch. However, it is to be understood that the transversely aligned width or thickness of the hook 10 may vary of any suitable thickness so as to be structural supportive of contents at the second end 14 thereof. For example, one particular hook 10 may have a transversely aligned thickness (i.e., dimension 29) between the first side surface 25 and the second side surface 27 of the first bar 24 that is in a range from about ⅛ inch to about ¼ inch.

In one particular embodiment, the height of the upper portion 44B of the rear wall 44 may be a range from about ⅛ inch. However, it is entirely possible for the upper portion 44B of the rear wall 44 to have a vertical height in a range from about 1/16 inch to about 3/16 inch. The lower portion 44A of the rear wall 44 in one particular embodiment may be about ¼ inch. However, in another particular embodiments, it is possible for the lower portion 44A of the rear wall 44 to be in a range from about ⅛ inch to about ⅜ inch. The approximate vertical distance (i.e., dimension 31) from the corner 48 to the corner 46 on the rear wall 44 is 10/32 inch; however, other suitable distances may be in a range from about 7/32 inch to about 13/32 inch. Thus, the overall height from the upper wall 26 to the lower wall 40 of the first bar 24 is about 21/32 inch (0.65625 inch).

Connecting bar 50 extends longitudinally outward towards the second end 14 from its rigid connection with the first bar 24. Connecting bar 50 includes a convexly curved wall 52 that extends in a curved manner between corner 48 and a transition point 54 that is approximately offset 90° from the corner 48. The transition point 54 refers to the point at which the curved wall 52 is no longer curved and then transitions into a flat wall on a second bar 56. The curved wall 52 has a radius of curvature that is convexly curved at about 5/16 inch (0.313 inch). However, the radius of curvature of the curved wall 52 may be any suitable radius of curvature in a range from about 3/16 inch to about 7/16 inch.

The flat wall 58, which may also be referred to as a rear wall 58, on the second bar 56 extends in a substantially vertical manner orthogonal to the longitudinal direction between the transition point 54 and a rounded corner 60. Connecting bar 50 further includes a lower wall 62 that is positioned parallel to the longitudinal direction of the hook 10 and perpendicular to the rear wall 44 on the first bar 24. The lower wall 62 on the connecting bar 50 extends in a longitudinal direction from the corner 46 to a corner 64. A forward flat wall 66 on the second bar 56 extends downwardly from corner 64 in a direction that is perpendicular or orthogonal to the longitudinal direction and parallel to the vertical direction of the hook 10 between the corner 64 and a rounded corner 68.

A slot 70 is defined and bound by the lower portion 44A of the rear wall 44 on the first bar 24 and the lower wall 62 on the connecting bar 50 and the forward wall 66 on the second bar 56. The longitudinal aligned thickness (i.e., dimension 33) of the slot 70 is defined by the distance between the lower portion 48A of the rear wall 44 and the forward wall 66. In one particular instance, the thickness (i.e., dimension 33) of the slot 70 between lower portion 44A and wall 66 is about 0.086 inch (about 11/128 inch). However, in other particular embodiments, the longitudinally aligned width (i.e., dimension 33) of the slot 70 defined by the spaced apart distance between lower portion 44A and wall 66 may be any appropriate distance in a range from about 5/64 inch to about ¼ inch.

Generally, the vertical distance of the hook 10 measured between the upper wall 26 and the rounded corner 68, which generally defines the bottom 18 of the hook 10, is in a range from about one inch to about 1.50 inches. However, in one particular embodiment, the vertically aligned distance between the upper wall 26 and the lower rounded corner 68 is 1.298 inches.

Similar to the first bar 24, the connecting bar 50 and the second bar 56 define first and second sides that are spaced apart and equal to a distance defined by the transversely aligned width of the connecting bar 50 and the second bar 56. Inasmuch as the hook 10 is configured to be a unibody monolithic member, the thickness of the connecting bar 50 and the thickness of the second bar 56 should equal that of the first bar 24 (i.e., dimension 29). However, it is entirely possible to have a first bar 24 that is thicker in the transverse direction than that of the connecting bar 50 and the second bar 56. As will be described in greater detail below, it may be possible to alter the thickness in the transverse direction of the connecting bar 50 and the second bar 56 so long as the thickness of the first bar 24 measured in the transverse direction between the first side and the second side surface is complementary to the transversely aligned width of a slot in a support structure (i.e., a pegboard).

The longitudinally aligned length of a portion of the hook 10 measured between the front wall 32 on the first bar 24 and the rear wall 58 on the second bar 56 may be in a range from about ¼ inch to about ¾ inch. However, in one particular embodiment, the distance between front wall 32 and rear wall 58 is about ½ inch. More particularly, in one specific embodiment, the distance between front wall 32 and the rear wall 58 is 0.524 inch.

A hook arm 72 extends outwardly in the longitudinal direction in a cantilevered manner from the lower end of the second bar 56 and terminates a distal free end 74 that defines the second end 14 of the hook 10. While certain portions of the present disclosure refer to the novelty of the manner in which the hook 10 connects to the slotted support surface through the use of the first bar 24, the connecting bar 52, and the second bar 56 that cooperate to define slot 70, as such, the arm 72 may take any shape between the lower portion of the second bar 56 and the free end 74.

In one particular embodiment, arm 72 is a generally linear member having a substantially planar and continuous upper wall 76 and an opposing lower wall 78. The upper wall 76 may connect with the rounded corner 60 and extend longitudinally towards the free terminal end 74 in a substantially linear and planar manner. The lower wall 78 may connect with the rounded corner 68 and extend in a substantially planar and linear manner parallel to the upper wall 76 to the free end 74. In one particular embodiment, the arm 72 is not parallel to the ground when the hook 10 is releasably connected to the slotted support structure. As depicted herein, the arm 72 may be angled at about 85° relative to the second bar 56. By angling the arm 72 at an angle slightly less than 90°, products, objects, or items that are supported by the arm 72 when the hook 10 is installed on support structure are biased via gravitational forces towards the first end 12 so as to reduce the likelihood that the item hanging from the arm 72 will fall off. As such, the hook 10 may be useful as a retail display system that is sized to hang products thereon.

Figure 6:
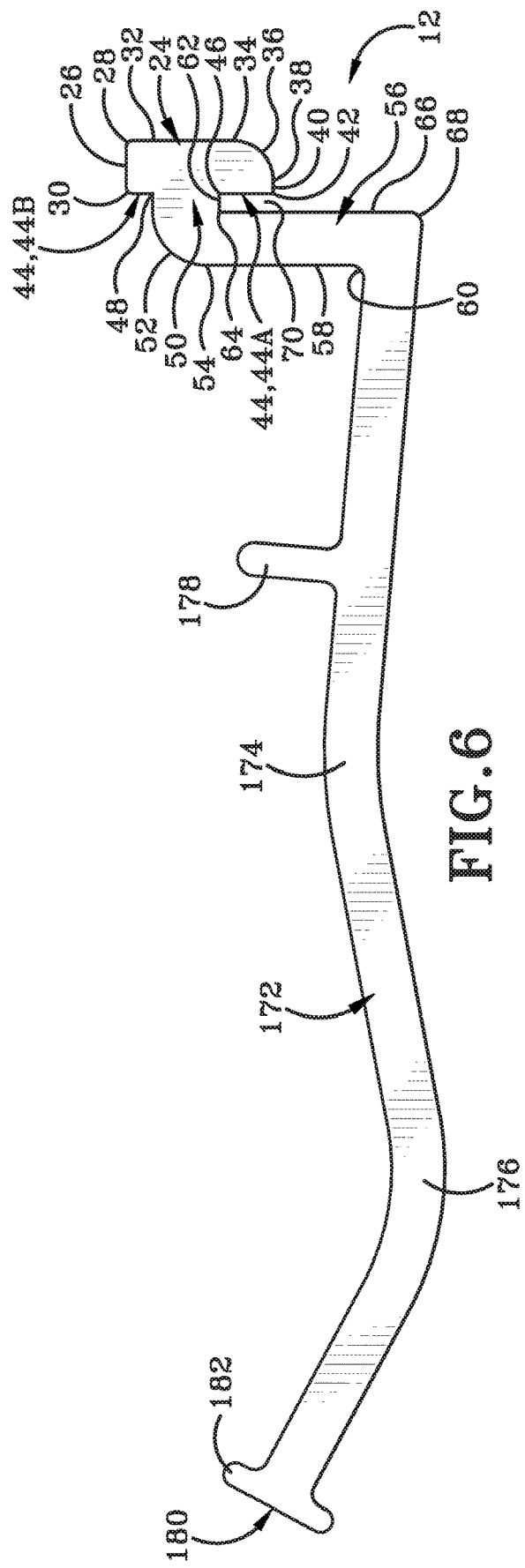
FIG. 6 (FIG. 6) is a side elevation view of an exemplary hook in accordance with another aspect of the present disclosure having a first end similar to that which is shown in FIG. 1-FIG. 5C but with a differing second end.

While the arm 72 shown as being a substantially linear member between its foremost end and the free end 74, other shapes are entirely possible. For example, as depicted in FIG. 6, an exemplary arm 172 in accordance with another exemplary embodiment, may be formed with a camber 174 so as to provide structural rigidity to the arm as it extends in a cantilevered manner from its connection with the second bar 56 out towards its terminal free end. Further, the arm 172 in accordance with this exemplary embodiment, may have an additional curved structure 176 so as to bias products when hung on the arm towards the first end 12 of the hook 10. Additionally, other structural support members may be connected to the arm, such as an upwardly extending member 178 located between the first end 12 and second end 14, which can be used to act as a stop to retain products at a desired location relative to the length of the arm 72. Further, the terminal free end 180 may include a small upwardly protruding edge 182 to further assist with retaining products on the arm 172.

Figure 4:
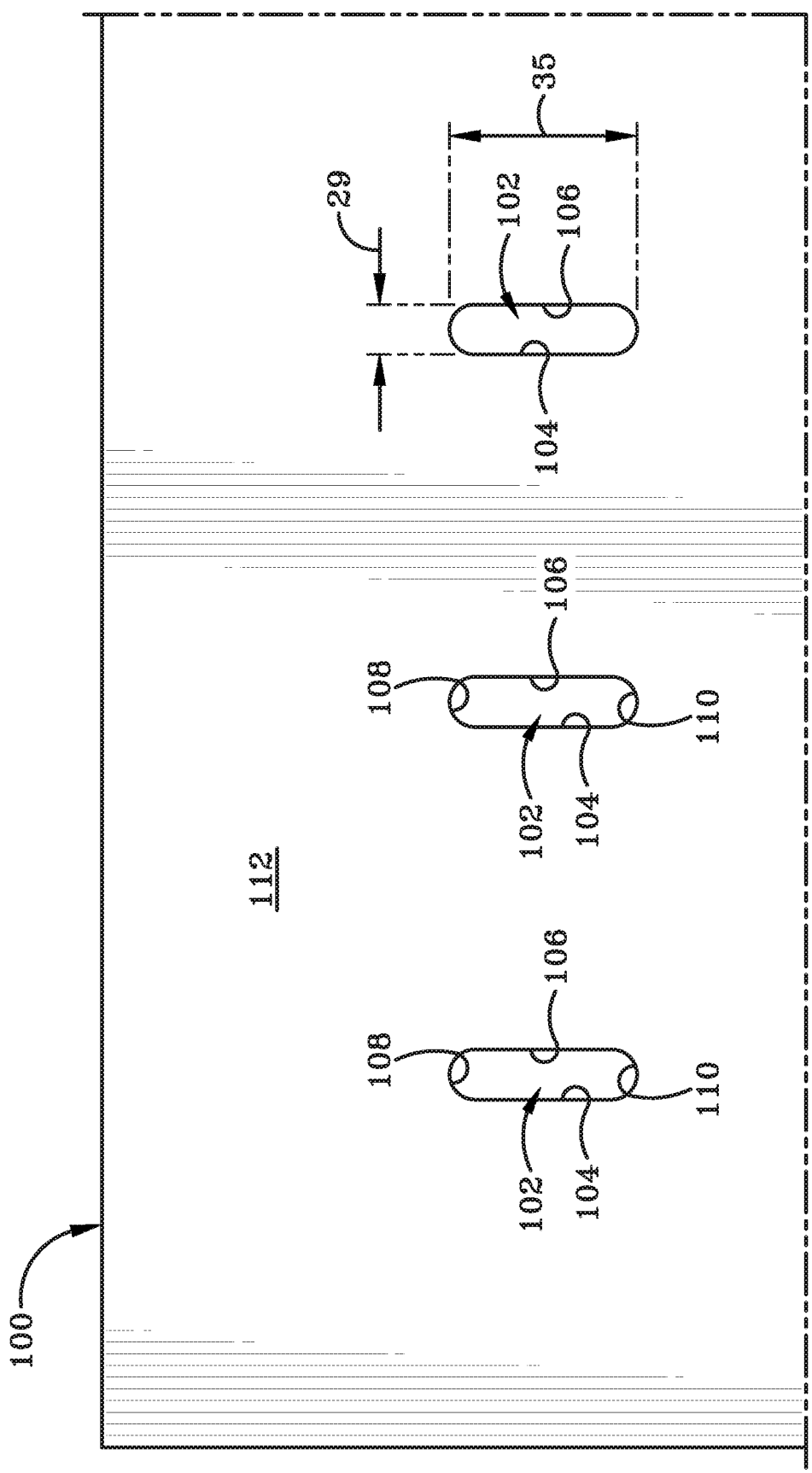
FIG. 4 (FIG. 4) is a enlarge front elevation view of the support structure depicting one exemplary row of slots or apertures formed therein.
Figure 5A:
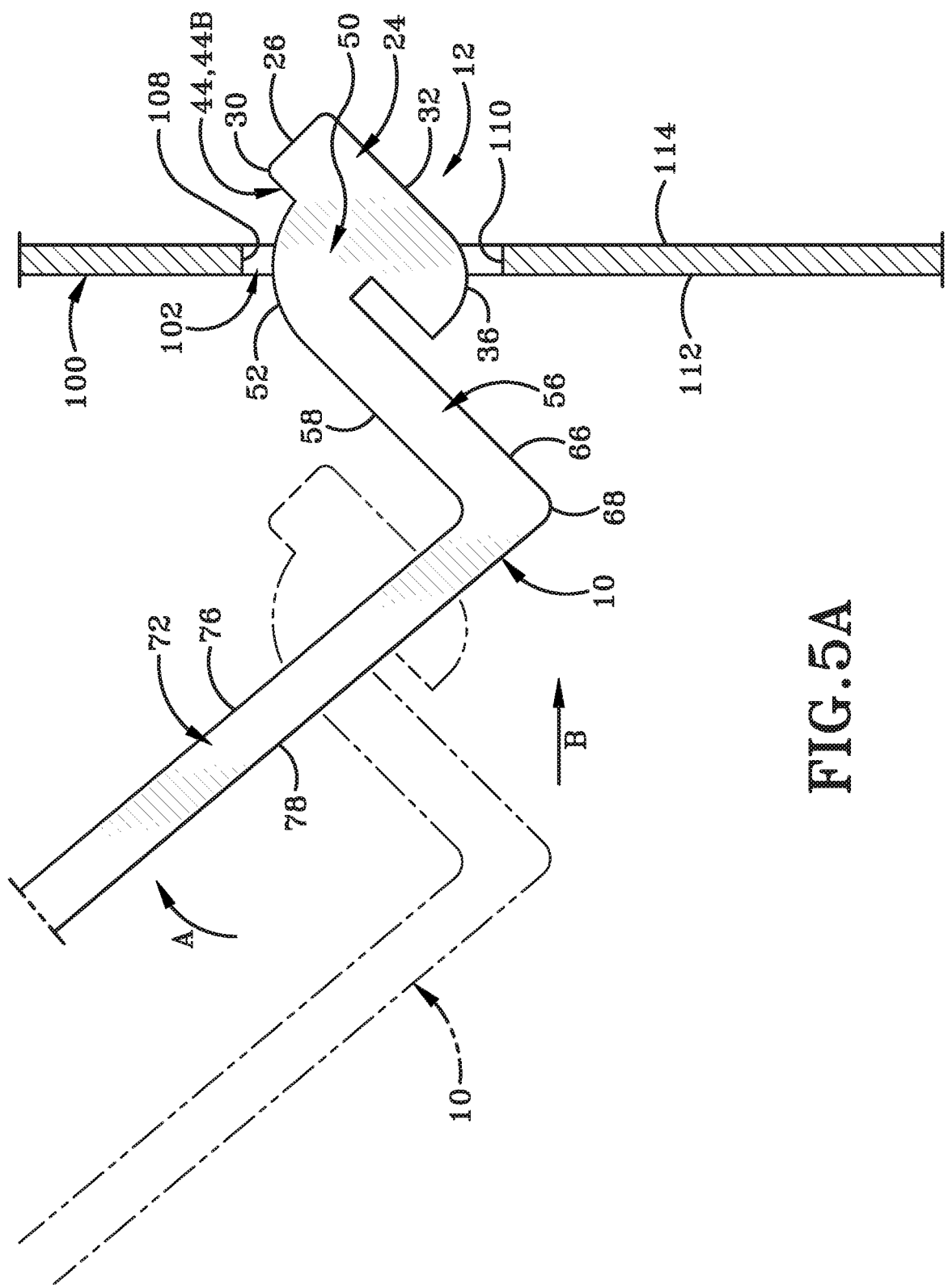
FIG. 5A (FIG. 5A) is an operational cross section view depicting the hook being inserted through one aperture or slot in the support structure.

FIG. 4 depicts the support structure in accordance with one aspect of the present disclosure generally at 100. The support structure includes a plurality of columns and rows of slots or apertures 102 extending entirely through the support structure 100 from its outwardly facing front surface 112 to its rearwardly facing back surface 114 (FIG. 5A). Each aperture or slot 102 may be formed by two parallel vertically aligned edges. More particularly, a first edge 104 is spaced apart and opposite and parallel to a second edge 106. The top of each edge 104, 106 is connected with a downwardly concave edge 108. The bottoms of each edge 104, 106 are connected with an upwardly concave edge 110. The concave edges may each have a radius of curvature approximating $^{13}/_{128}$ inch (about 0.101 inch). Collectively, the edges 104, 106, 108, 110 define the aperture 102 as a slot having a rounded top and a rounded bottom. The width of the slot or aperture 102 measured between the edge 104 and edge 106 is complimentary to the thickness (i.e., dimension 29) of the hook 10 measured between its first side surface 25 and its second side surface 27. Since the transversely aligned width or thickness (i.e., dimension 29) of the hook 10 complements the width of the slot or aperture 102, it is to be understood that the first end 12 of the hook 10 may slide through the slot or aperture 102.

The vertical length (i.e., dimension 35) of the slot or aperture 102 measured between concave edge 108 and concave edge 110 may be greater than, equal to, or less than the vertically aligned length of the first bar 24 measured between its upper wall 26 and its lower wall 40. In one particular embodiment, as depicted in FIGS. 5A-5C, the first bar 24 has a lesser length (i.e., dimension 31) measured in the vertical direction between the upper wall 26 and the lower wall 40 than the vertically aligned length of the slot or aperture 102.

Having thus described some exemplary structure with respect to the hook 10, reference will not be made to its operation and its connection to the support structure 100. Further, while it is envisioned that the hook 10 be used in conjunction with a retail display system such that the hook 10 is a connector for selective attachment with the support structure 100, it is not necessary that the hook 10 be used in a retail setting. For example, the hook 10 could be used in conjunction with industrial applications or personal/home applications as well.

Figure 5B:
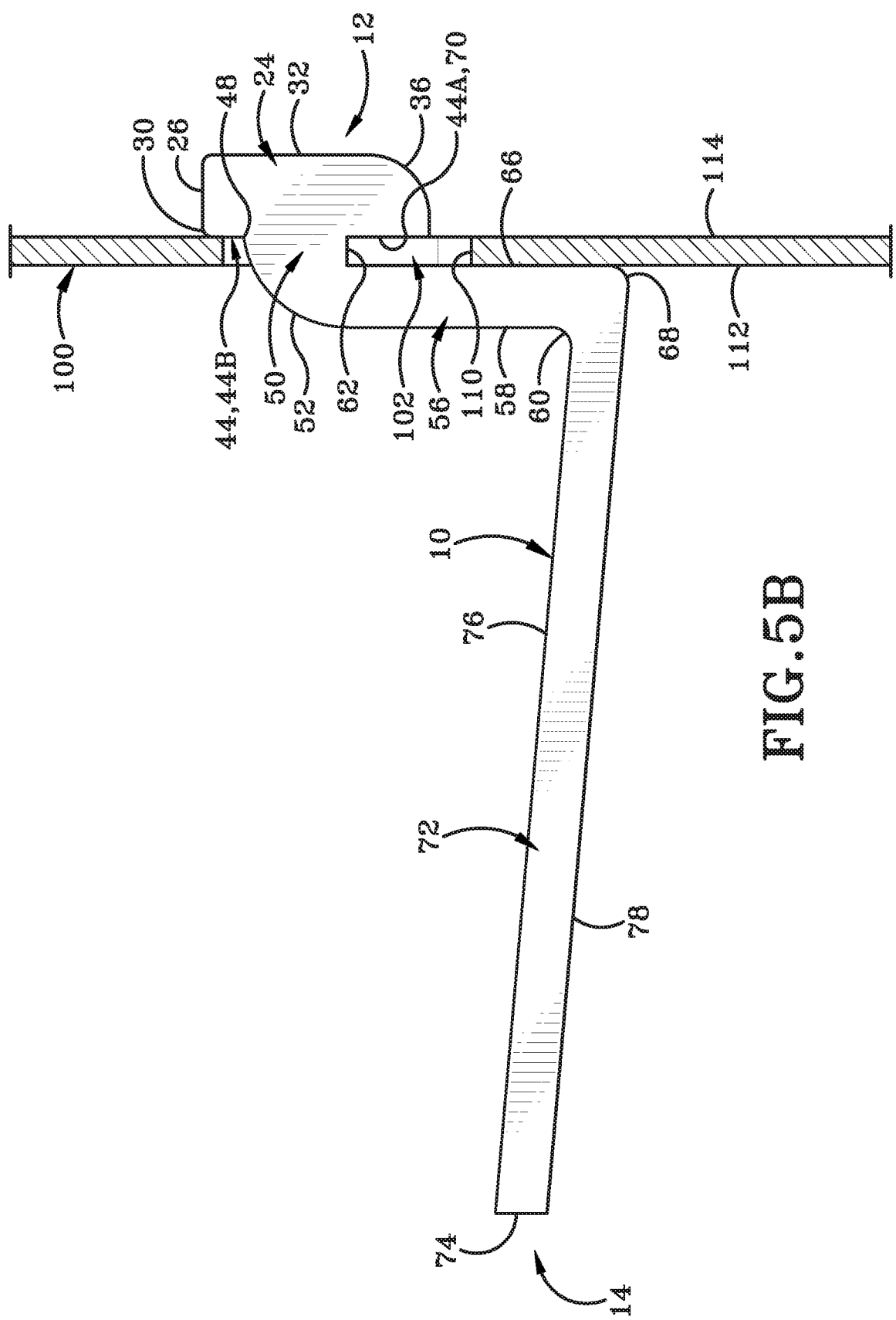
FIG. 5B (FIG. 5B) is an operation cross section view depicting the hook disposed within the aperture or slot and oriented toward an upper end of the slot.
Figure 5C:
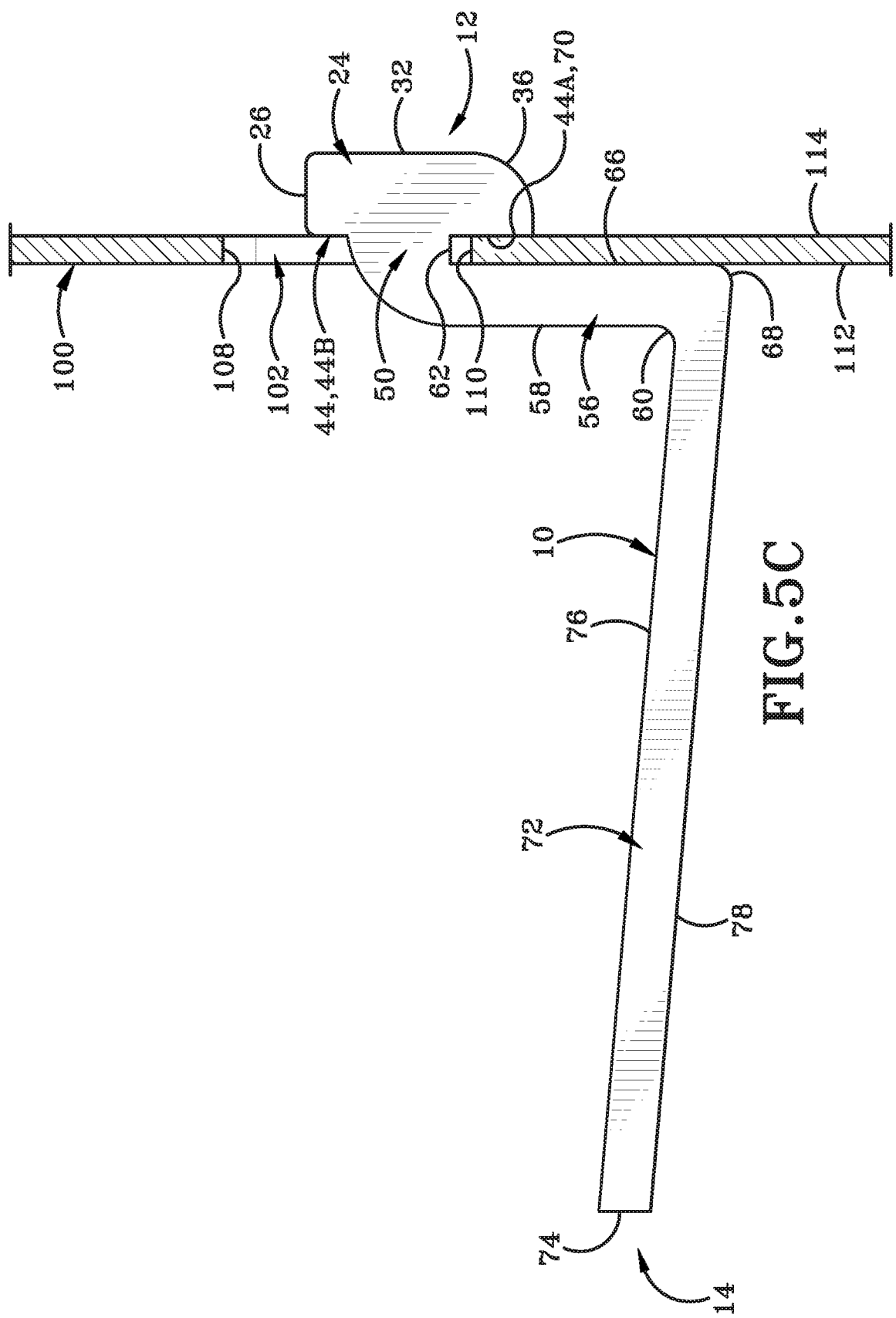
FIG. 5C (FIG. 5C) is a cross section view depicting the hook connected to the support structure such that a lower edge of the aperture is disposed within a slot on the hook such that the hook straddles the support structure to preclude inadvertent disconnection when the hook is subject to rotational forces when an object is removed from hook.

FIG. 5A-FIG. 5C depict that the hook 10 may be connected with the support structure 100 by first aligning the hook 10 such that it is offset parallel and spaced apart from the support structure 100. The operator who desires to attach the hook 10 to the support structure 100 via one of the slots or apertures 102 may align the hook 10 such that the first end 12 is oriented closer to the support structure 100 than the second end 14. The operator moves the first end 12 towards the slot or aperture 102, as indicated by arrow B. When the first end 12 of the hook 10 is slightly spaced apart from the front surface of the support structure 100, the hook 10 is rotated in the clockwise direction (arrow A) about an imaginary transverse axis extending through the hook from the first side 20 to the second side 22, when viewed from the first side 20, such that the front wall 32 of the first bar 24 is angled slightly downward. Clockwise rotation of the hook 10 will angle the rear wall 44 of the first bar 24 slightly upwardly. When the hook 10 is in the clockwise rotated position, first bar 24 may be passed through the slot or aperture 102 between the first edge 104 and the second edge 106 in the direction of Arrow B. The rounded corner 30 passes below the upper concave edge 108.

FIG. 5B depicts that the user may then lift or raise the hook 10 in the vertical direction such that the rear surface of the support structure 100 is positioned closely adjacent the upper portion 44B of rear wall 44. When the user raises the hook 10, the downwardly concave edge 108 is closely adjacent the corner 48 that connects the upper portion 44B of the rear wall 44 with the rounded wall 52 of the connecting bar 50. When the concave edge 108 is nested against the corner 48, the user may then rotate the hook 10 in the counterclockwise direction allowing the curved wall 36 to pass over the lower concave edge 110. As described herein, the clockwise and subsequent counterclockwise rotation, when viewed from the first side, may be required to fit the first bar 24 through the slot or aperture 102.

FIG. 5C depicts that when the first bar 24 is positioned rearwardly from the rear surface of support structure 100, the operator may continue to push the hook 10 downwardly in the vertical direction such that the lower upwardly facing concave edge 110 fits within slot 70. More particularly, the user will continue to push the hook 10 downwardly until the upwardly facing concave edge 110 contacts and rests against the lower wall 62 of the connecting bar 50. As mentioned previously, the longitudinally aligned width of the slot 70 measured between the lower portion 44A and the front wall 66 of the second bar 56 corresponds in thickness to the support structure 100 measured between its front surface and its rear surface. Accordingly, the hook 10 is able to straddle or slideably connect with the lower concave edge 110 of the support structure 100. When the hook 10 is urged downwardly to connect with the concave edge 110, the upper portions of the first bar 24 are still positioned rearwardly from the rear surface 114 of the support structure 100 but may the upper wall 26 may be below the upper concave edge 108. As such, when the lower upwardly facing concave edge 110 defining a portion of the slot or aperture 102 engages the lower wall 62 on the connecting bar 50, the upper portion 44B of the rear wall 44 on the first bar 24 is positioned rearward and below the upper downwardly facing concave edge 108 of the slot or aperture 102.

In operation and with reference to FIG. 1, with the first end 12 of the hook 10 being secured to the support structure 100 as discussed above, the hook arm 72 may be utilized to store and retain items thereon. For example, when used in a retail display environment, after the first end 12 of the hook 10 is connected to the support structure 100, retail products may be slideably connected to the arm 72 by passing a portion of the product over the free terminal end 74 and moving the same along the length the arm 72. Further, as mentioned before, portions of the arm 72 may be angled at an angle less than 90° relative to the second bar 56 and relative to the planar front surface of the support structure 100. As such, the retail items that are hung on the arm 72 may be biased toward the support structure 100 under gravitational forces so as to prevent the objects from sliding off of the arm 72 inadvertently.

One problem that previous prior art retail display systems, such as conventional pegboards and pegboard hooks, failed to address is that a hook is easily disconnected when removing an item from the outwardly extending arm, such as arm 72. The hook 10 of the present disclosure remains secured to the support structure 100 when the retail product is removed from the arm 72 because the vertically aligned length of the first bar 24 is behind surface 114 and below the slot or aperture 102. As such, if the product is slideably removed from the arm 72 and a slight lifting action imparts a rotational force to the hook 10 when removing the retail product, the hook 10 will not rotate upwardly to encourage the hook 10 to disconnect from the support structure 100 because lower portion 44A of the rear wall 44 of the first bar 24 engagingly contacts the second or rear surface 114 of the support structure 100 below the upwardly facing concave edge 110. Thus, when the hook 10 is connected to the support structure 100, inadvertent clockwise or counterclockwise rotational forces will not dislodge the hook 10 from its releasable connection with the support structure 100 because the lower portions of the first bar 24 are positioned below the upwardly facing concave edge 110 and discourage rotational movement. Stated otherwise, the first bar 24, the connecting bar 50, and the second bar 56 straddle the lower edge 110 of the support structure to equalize and stabilize the hook 10 when subjected to rotational forces during the removal of the object from the arm 72.

However, this is not to say that the hook 10 is unremovable. Hook 10 may be selectively and purposefully disconnected from its connection with support structure 100 by applying a vertical or nearly vertical vector force. An operator may remove the hook 10 from its connection with the support structure 100 by reversing the installation steps identified with respect to FIG. 5A-FIG. 5C. Namely, in order to remove the hook 10 from its connection with the support structure 100, an operator must first apply an upward vertical force, or nearly vertical, so as to dislodge the upwardly facing concave edge 110 from its connection with the lower wall 62 on the connecting bar 50. The user continues this upward vertical movement until the upper concave edge 108 of the slot or aperture 102 is positioned closely adjacent the corner 48 and the corner 42 of the lower portion 44A is positioned above the lower upwardly facing concave edge 110. When the corner 42 is above the concave edge 110, the user may rotate the hook 10 in the clockwise direction, when viewed from the first side, so as to enable the lower wall 40 and the curved wall 36 to pass over the lower concave edge 110. When the lower wall 40 and the curved wall 36 pass over the concave edge 110, the user may then slightly lower the hook 10 in the vertical direction while continuing to rotate the hook 10 in the clockwise direction, when viewed from the first side, so as to enable the portions of first bar 24, namely, the corner 30 to pass beneath the upper downwardly facing concave edge 108 while pulling the hook 10 outwardly and away from the support structure 100 (in a direction opposite Arrow B). When the hook 10 is disconnected from the support structure 100, the operator may store the same in a safe location or may adjust the location of the hook 10 to another aperture on the support structure 100 so as to variably fit the needs of the retainer depending on the sizes of the retail products to be displayed.

The hook 10 of the present disclosure may be manufactured in a number of different ways. Further, the hook 10 may be manufactured from a number of different suitable materials. However, it is envisioned that one exemplary material utilized to fabricate the hook 10 is a metal material, such as steel or stainless steel. The hook 10 may be fabricated from a sheet of metal material. Accordingly, prior to manufacturing the hook 10, the sheet of metal material may be laid out on a cutting device, such as a laser cutter or a high pressure fluid cutter. A digital computer aided drawing file having the structural dimensions of the hook 10 may be uploaded to the cutting device. The cutting device then may be executed via an execution call in order to cut the hook 10 to the dimensions detailed in the digital file. Thus, since the raw material (i.e., the planar sheet of stainless steel) has a substantially planar first surface opposite a substantially planar second surface, when the hook 10 is cut from the same, first and second sides surfaces 25, 27 of the hook 10 are defined by the original planar sides of the raw sheet material. As such, if portions of the hook 10 were viewed in cross-section, the hook 10 would have a substantially rectangular or square cross-section depending on the dimensions of that portion of the hook 10 where the cross-section was viewed. According to one exemplary aspect, the square or rectangular cross-section of the hook 10 has been found beneficial to preclude rotation of the hook 10, relative to the longitudinal axis, when it is connected to the support structure 100. Thus, while it would be possible to fabricate the hook 10 having a circular cross-section, it may be preferential, according to one exemplary aspect, to have a square or rectangular cross-section of the hook 10. More particularly, a square or rectangular cross-section, as measured in the transverse direction, may prove beneficial for the first bar 24, the connecting bar 50, and the second bar 56. These bars 24, 50, 56 may collectively be referred to as a connection portion so as to effectuate the connection in a secure but rigid manner of the hook 10 to the support structure 100. It is not necessary that the arm 72 or arm 172 (or any other shaped arm) have a square cross-section as the connecting portion defined by the bars 24, 50, 56. One exemplary alternative hook 10 could have the first bar 24, the connecting bar 50, and the second bar 56 all having square or rectangular cross-sections and a different hook arm being connected to the second bar 56 having a differing cross-section, such as a circular cross-section similar to that of a wire arm.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral" and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A hook for selectively connecting with a support structure defining a plurality of apertures, wherein the hook is repeatably connected to one aperture in the support structure, the hook comprising:
    a first end opposite a second end defining a longitudinal direction therebetween;
    a first side opposite a second side defining a transverse direction therebetween that is orthogonal to the longitudinal direction;
    a top opposite a bottom defining a vertical direction therebetween that is orthogonal to the longitudinal direction and the transverse direction;
    a first bar having a length oriented in the vertical direction, and the first bar including an upper wall offset parallel to a lower wall, and a front wall extending vertically downward from a forward end of the upper wall, and a convexly curved wall connected to a lower end of the front wall curving approximately ninety degrees from the lower end of the front wall to the lower wall, and the first bar including a rear wall, and wherein the first bar is rectangular or square in cross section;
    a connecting bar rigidly connected to the rear wall of the first bar and extending outwardly therefrom in the longitudinal direction towards the second end and offset closer to the upper wall on the first bar than the lower wall of the first bar, and the connecting bar including a convexly curved upper wall curving approximately ninety degrees from the rear wall first bar, wherein the connection of the connecting bar to the rear wall of the first bar divides the rear wall of the first bar into an upper portion and a lower portion, and the connecting bar includes a lower wall extending orthogonal outward towards the second end from the rear wall of the first bar;
    a second bar having a length oriented in the vertical direction, and the second bar including a front wall spaced apart and offset parallel to the rear wall of the first bar, and the second bar including a rear wall extending vertically downward from the convexly curved upper wall on the connecting bar; and
    a slot defined between the lower portion of the rear wall on the first bar, the lower wall on the connecting bar, and the forward wall on the second bar, wherein the slot is adapted to receive a lower edge defining a portion of the one aperture in the support structure, wherein the shape of the slot precludes detachment or disconnection of the hook from the support structure when the hook is subjected to rotational forces when attaching and removing objects from the hook.

2. The hook of claim 1, further comprising:
    an arm extending outwardly in a cantilevered manner from the second bar towards a free terminal end, wherein the arm is angled relative to the second bar at an angle less than 90 degrees operative to gravitationally bias object or products support by the arm towards the support structure.

* * * * *